United States Patent
Palmateer et al.

(10) Patent No.: US 7,692,839 B2
(45) Date of Patent: Apr. 6, 2010

(54) SYSTEM AND METHOD OF PROVIDING MEMS DEVICE WITH ANTI-STICTION COATING

(75) Inventors: Lauren Palmateer, San Francisco, CA (US); William J. Cummings, San Francisco, CA (US); Brian J. Gally, San Rafael, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 87 days.

(21) Appl. No.: 11/119,433

(22) Filed: Apr. 29, 2005

(65) Prior Publication Data

US 2006/0077503 A1    Apr. 13, 2006

Related U.S. Application Data

(60) Provisional application No. 60/613,852, filed on Sep. 27, 2004.

(51) Int. Cl.
G02B 26/00 (2006.01)
G02B 26/08 (2006.01)

(52) U.S. Cl. .................. 359/237; 359/290; 359/298

(58) Field of Classification Search ................ 359/220, 359/223–224, 237, 260, 290–292, 295, 298
See application file for complete search history.

(56) References Cited

U.S. PATENT DOCUMENTS

| | | | |
|---|---|---|---|
| 2,534,846 | A | 12/1950 | Ambrose et al. |
| 3,439,973 | A | 4/1969 | Paul et al. |
| 3,443,854 | A | 5/1969 | Weiss |
| 3,653,741 | A | 4/1972 | Marks |

(Continued)

FOREIGN PATENT DOCUMENTS

EP    0 667 548    8/1995

(Continued)

OTHER PUBLICATIONS

Akasaka, "Three-Dimensional IC Trends", Proceedings of IEEE, vol. 74, No. 12, pp. 1703-1714, (Dec. 1986).

(Continued)

*Primary Examiner*—Scott J Sugarman
*Assistant Examiner*—Dawayne A Pinkney
(74) *Attorney, Agent, or Firm*—Knobbe Martens Olson & Bear LLP

(57) ABSTRACT

In various embodiments of the invention, an anti-stiction coating is formed on at least one surface of an interior cavity of a MEMS device. Particular embodiments provide an anti-stiction on one or mirror surfaces of an interferometric light modulation device, also known as an iMoD in some embodiments. In other embodiments, an interferometric light modulation device is encapsulated within a package and the anti-stiction coating is applied after the package is fabricated. In one embodiment, one or more orifices are defined in the package, e.g., in a seal, a substrate or a backplate and the anti-stiction coating material is supplied into the interior of the package via the orifice(s). In one embodiment, the anti-stiction coating material includes a self-aligned (or self-assembled) monolayer. In yet another embodiment, the anti-stiction layer coating can be incorporated into a release process where a sacrificial layer of an interferometric light modulation device is etched away with the use of a gas.

20 Claims, 11 Drawing Sheets

U.S. PATENT DOCUMENTS

| | | | |
|---|---|---|---|
| 3,656,836 A | 4/1972 | de Cremoux et al. |
| 3,813,265 A | 5/1974 | Marks |
| 3,955,880 A | 5/1976 | Lierke |
| 4,036,360 A | 7/1977 | Deffeyes |
| 4,074,480 A | 2/1978 | Burton |
| 4,099,854 A | 7/1978 | Decker et al. |
| 4,228,437 A | 10/1980 | Shelton |
| 4,377,324 A | 3/1983 | Durand et al. |
| 4,389,096 A | 6/1983 | Hori et al. |
| 4,403,248 A | 9/1983 | te Velde |
| 4,431,691 A | 2/1984 | Greenlee |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,954,789 A | 9/1990 | Sampsell |
| 4,956,619 A | 9/1990 | Hornbeck |
| 4,977,009 A | 12/1990 | Anderson et al. |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,244,707 A | 9/1993 | Shores |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,296,950 A | 3/1994 | Lin et al. |
| 5,304,419 A | 4/1994 | Shores |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,591,379 A | 1/1997 | Shores |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A * | 3/1997 | Wallace et al. ............ 257/682 |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoades et al. |
| 5,619,366 A | 4/1997 | Rhoads et al. |
| 5,636,052 A | 6/1997 | Arney et al. |
| 5,646,768 A | 7/1997 | Kaeiyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,703,710 A | 12/1997 | Brinkman et al. |
| 5,710,656 A | 1/1998 | Goosen |
| 5,739,945 A | 4/1998 | Tayebati |
| 5,745,193 A | 4/1998 | Urbanus et al. |
| 5,745,281 A | 4/1998 | Yi et al. |

| | | |
|---|---|---|
| 5,771,116 A | 6/1998 | Miller et al. |
| 5,777,705 A | 7/1998 | Pierson et al. |
| 5,784,190 A | 7/1998 | Worley |
| 5,784,212 A | 7/1998 | Hornbeck |
| 5,815,141 A | 9/1998 | Phares |
| 5,818,095 A | 10/1998 | Sampsell |
| 5,825,528 A | 10/1998 | Goosen |
| 5,835,255 A | 11/1998 | Miles |
| 5,842,088 A | 11/1998 | Thompson |
| 5,853,662 A | 12/1998 | Watanabe |
| 5,875,011 A | 2/1999 | Pierson et al. |
| 5,912,758 A | 6/1999 | Knipe et al. |
| 5,936,758 A | 8/1999 | Fisher et al. |
| 5,939,785 A | 8/1999 | Klonis et al. |
| 5,986,796 A | 11/1999 | Miles |
| 6,024,801 A | 2/2000 | Wallace et al. |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,061,075 A | 5/2000 | Nelson et al. |
| 6,099,132 A | 8/2000 | Kaeriyama |
| 6,113,239 A | 9/2000 | Sampsell et al. |
| 6,147,790 A | 11/2000 | Meier et al. |
| 6,158,283 A | 12/2000 | Shinogi et al. |
| 6,160,833 A | 12/2000 | Floyd et al. |
| 6,180,428 B1 | 1/2001 | Peeters et al. |
| 6,201,633 B1 | 3/2001 | Peeters et al. |
| 6,232,936 B1 | 5/2001 | Gove et al. |
| 6,238,755 B1 | 5/2001 | Harvey et al. |
| 6,262,696 B1 | 7/2001 | Seraphim et al. |
| 6,282,010 B1 | 8/2001 | Sulzbach et al. |
| 6,295,154 B1 | 9/2001 | Laor et al. |
| 6,323,982 B1 | 11/2001 | Hornbeck |
| 6,379,988 B1 | 4/2002 | Peterson et al. |
| 6,447,126 B1 | 9/2002 | Hornbeck |
| 6,465,355 B1 | 10/2002 | Horsley |
| 6,466,358 B2 | 10/2002 | Tew |
| 6,473,274 B1 | 10/2002 | Maimone et al. |
| 6,480,177 B2 | 11/2002 | Doherty et al. |
| 6,496,122 B2 | 12/2002 | Sampsell |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,574,033 B1 * | 6/2003 | Chui et al. ............ 359/291 |
| 6,589,625 B1 | 7/2003 | Kothari et al. |
| 6,600,201 B2 | 7/2003 | Hartwell et al. |
| 6,606,175 B1 | 8/2003 | Sampsell et al. |
| 6,625,047 B2 | 9/2003 | Coleman, Jr. |
| 6,630,786 B2 | 10/2003 | Cummings et al. |
| 6,632,698 B2 | 10/2003 | Ives |
| 6,643,069 B2 | 11/2003 | Dewald |
| 6,650,455 B2 | 11/2003 | Miles |
| 6,666,561 B1 | 12/2003 | Blakley |
| 6,674,562 B1 | 1/2004 | Miles |
| 6,680,792 B2 | 1/2004 | Miles |
| 6,710,908 B2 | 3/2004 | Miles et al. |
| 6,741,377 B2 | 5/2004 | Miles |
| 6,741,384 B1 | 5/2004 | Martin et al. |
| 6,741,503 B1 | 5/2004 | Farris et al. |
| 6,747,785 B2 | 6/2004 | Chen et al. |
| 6,775,174 B2 | 8/2004 | Huffman et al. |
| 6,778,155 B2 | 8/2004 | Doherty et al. |
| 6,794,119 B2 | 9/2004 | Miles |
| 6,809,852 B2 * | 10/2004 | Tao et al. ............ 359/290 |
| 6,811,267 B1 | 11/2004 | Allen et al. |
| 6,819,469 B1 | 11/2004 | Koba |
| 6,822,628 B2 | 11/2004 | Dunphy et al. |
| 6,829,132 B2 | 12/2004 | Martin et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 7,123,216 B1 | 10/2006 | Miles |
| 7,148,603 B1 * | 12/2006 | Garcia et al. ............ 310/309 |
| 2001/0003487 A1 | 6/2001 | Miles |
| 2002/0012744 A1 * | 1/2002 | Miller et al. ............ 427/58 |
| 2002/0015215 A1 | 2/2002 | Miles |
| 2002/0024711 A1 | 2/2002 | Miles |
| 2002/0052392 A1 | 5/2002 | Day et al. |
| 2002/0075555 A1 | 6/2002 | Miles |
| 2002/0126364 A1 | 9/2002 | Miles |
| 2003/0021004 A1 | 1/2003 | Cunningham et al. |
| 2003/0043157 A1 | 3/2003 | Miles |
| 2003/0054588 A1 | 3/2003 | Patel et al. |
| 2003/0062186 A1 | 4/2003 | Boroson et al. |
| 2003/0072070 A1 | 4/2003 | Miles |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2004/0012061 A1 * | 1/2004 | Reid et al. ............ 257/415 |
| 2004/0037956 A1 | 2/2004 | Yang |
| 2004/0051929 A1 | 3/2004 | Sampsell et al. |
| 2004/0058532 A1 | 3/2004 | Miles et al. |
| 2004/0061492 A1 | 4/2004 | Lopes et al. |
| 2004/0080807 A1 | 4/2004 | Chen et al. |
| 2004/0100677 A1 | 5/2004 | Huibers et al. |
| 2004/0145049 A1 | 7/2004 | McKinnell et al. |
| 2004/0147056 A1 | 7/2004 | McKinnell et al. |
| 2004/0160143 A1 | 8/2004 | Shreeve et al. |
| 2004/0174583 A1 | 9/2004 | Chen et al. |
| 2004/0179281 A1 | 9/2004 | Reboa |
| 2004/0184133 A1 | 9/2004 | Su et al. |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0038950 A1 | 2/2005 | Adelmann |
| 2005/0046922 A1 | 3/2005 | Lin et al. |
| 2005/0057442 A1 | 3/2005 | Way |
| 2005/0068583 A1 | 3/2005 | Gutkowski et al. |
| 2005/0069209 A1 | 3/2005 | Damera-Venkata et al. |
| 2005/0074919 A1 | 4/2005 | Patel et al. |
| 2005/0139940 A1 | 6/2005 | Patel et al. |
| 2005/0170540 A1 | 8/2005 | Patel et al. |
| 2005/0170547 A1 | 8/2005 | Patel et al. |
| 2005/0170557 A1 | 8/2005 | Patel et al. |
| 2005/0170614 A1 | 8/2005 | Patel et al. |
| 2005/0173711 A1 | 8/2005 | Patel et al. |
| 2005/0179982 A1 | 8/2005 | Patel et al. |
| 2005/0180686 A1 | 8/2005 | Patel et al. |
| 2005/0181532 A1 | 8/2005 | Patel et al. |
| 2005/0191789 A1 | 9/2005 | Patel et al. |
| 2005/0191790 A1 | 9/2005 | Patel et al. |
| 2005/0214976 A1 | 9/2005 | Patel et al. |
| 2005/0260792 A1 | 11/2005 | Patel et al. |
| 2005/0260793 A1 | 11/2005 | Patel et al. |
| 2006/0066935 A1 | 3/2006 | Cummings et al. |

| | | |
|---|---|---|
| 2006/0262380 A1* | 11/2006 | Miles .................. 359/290 |

FOREIGN PATENT DOCUMENTS

| | | |
|---|---|---|
| JP | 02-068513 | 3/1990 |
| JP | 03-199920 | 8/1991 |
| JP | 2002-82293 | 3/2002 |
| JP | 2002-287047 | 10/2002 |
| JP | 2004-004430 | 1/2004 |
| WO | WO9530924 | 11/1995 |
| WO | WO9717628 | 5/1997 |
| WO | WO 99/41732 | 8/1999 |
| WO | WO9952006 A2 | 10/1999 |
| WO | WO9952006 A3 | 10/1999 |
| WO | WO03007049 A1 | 1/2003 |
| WO | WO03069413 A1 | 8/2003 |
| WO | WO03073151 A1 | 9/2003 |
| WO | WO2004006003 A1 | 1/2004 |
| WO | WO2004026757 A2 | 4/2004 |
| WO | WO 2005/066596 | 7/2005 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23. (1994).

Conner, "Hybrid Color Display Using Optical Interference Filter Array," SID Digest, pp. 577-580 (1993).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).

Gosch, "West Germany Grabs the Lead in X-Ray Lithography," Electronics pp. 78-80 (Feb. 5, 1987).

Howard et al., "Nanometer-Scale Fabrication Techniques", VLSI Electronics: Microstructure Science, vol. 5, pp. 145-153 and pp. 166-173 (1982).

Jackson "Classical Electrodynamics", John Wiley & Sons Inc., pp. 568-573. (date unknown).

Jerman et al., "A Miniature Fabry-Perot Interferometer with a Corrugated Silicon Diaphragm Support", (1988).

Johnson "Optical Scanners", Microwave Scanning Antennas, vol. 1, p. 251-261, (1964).

Light over Matter, Circle No. 36 (Jun. 1993).

Miles, Mark, W., "A New Reflective FPD Technology Using Interferometric Modulation", The Proceedings of the Society for Information Display (May 11-16, 1997).

Newsbreaks, "Quantum-trench devices might operate at terahertz frequencies", Laser Focus World (May 1993).

Oliner et al., "Radiating Elements and Mutual Coupling", Microwave Scanning Antennas, vol. 2, pp. 131-141, (1966).

Raley et al., "A Fabry-Perot Microinterferometer for Visible Wavelengths", IEEE Solid-State Sensor and Actuator Workshop, Jun. 1992, Hilton Head, SC.

Sperger et al., "High Performance Patterned All-Dielectric Interference Colour Filter for Display Applications", SID Digest, pp. 81-83, (1994).

Stone, "Radiation and Optics, An Introduction to the Classical Theory", McGraw-Hill, pp. 340-343, (1963).

Walker, et al., "Electron-beam-tunable Interference Filter Spatial Light Modulator", Optics Letters vol. 13, No. 5, pp. 345-347, (May 1988).

Winton, John M., "A novel way to capture solar energy", Chemical Week, (May 1985).

Wu, "Design of a Reflective Color LCD Using Optical Interference Reflectors", Asia Display '95, pp. 929-931, (Oct. 1995).

Ashurst, R.W., et al. "Vapor-Phase Anti-Stiction Coatings for MEMS" IEEE transactions o Device and materials reliability vol. 3, No. 4 Dec. 2003, pp. 173-178.

Liang, et al. "A Low Temperature Wafer-level hermetic MEMS package using UV curable adhesive" Electronic Components and Technology 2004, pp. 1486-1491.

Maboudian, R., et al. "Self-Assembled Monolayers as Anti-stiction coatings for MEMS: characteristics and recent developments" Sensors and Actuators 82, (2000) pp. 219-223.

Moraja, et al. Advanced Getter Solutions at Wafer Level to Assure High Reliability to the last Generations MEMS, IEEE Reliability Physics Symposium Proceedings, 2003 pp. 458-459.

Sparks, et al. Chip-Level Vacuum Packaging of Micromachines Using NanoGetters, IEEE Transactions on Advanced Packaging, vol. 26 Issue 3, Aug. 2003, pp. 277-282.

European Search Report for EP 05255675.01.

European Search Report for EP 05255679.02.

Ashurst, et al., Dichlorodimethylsilane as an Anti-Stiction Monolayer for MEMS: A Comparison to the Octadecyltrichlosilane Self-Assembled Monolayer, Journal of Microelectromechanical Systems, vol. 10, No. 1, Mar. 2001, pp. 41-49.

Office Action dated May 9, 2008 in Chinese App. No. 200510103555.X.

Office Action dated Jan. 16, 2009 in Chinese App. No. 200510103555.X.

Notice of Reasons for Rejection dated Aug. 19, 2008 in Japanese App. No. 2005-237311.

* cited by examiner

SYSTEM AND METHOD OF PROVIDING MEMS DEVICE WITH ANTI-STICTION COATING

CROSS-REFERENCE TO RELATED APPLICATIONS

This application claims priority under 35 U.S.C. § 119(e) to U.S. Provisional Application No. 60/613,852, filed on Sep. 27, 2004, which is hereby incorporated by reference in its entirety.

BACKGROUND

The field of the invention relates to micro-electro-mechanical (MEMS) systems. More specifically, the invention relates to systems and methods of providing an anti-stiction coating in a MEMS device, including an interferometric light modulator.

MEMS include micro mechanical elements, actuators, and electronics. Micromechanical elements may be created using deposition, etching, and or other micromachining processes that etch away parts of substrates and/or deposited material layers or that add layers to form electrical and electromechanical devices.

Spatial light modulators are an example of MEMS systems. Spatial light modulators used for imaging applications come in many different forms. Transmissive liquid crystal device (LCD) modulators modulate light by controlling the twist and/or alignment of crystalline materials to block or pass light. Reflective spatial light modulators exploit various physical effects to control the amount of light reflected to the imaging surface. Examples of such reflective modulators include reflective LCDs, and digital micromirror devices (DMD™).

Another example of a spatial light modulator is an interferometric modulator that modulates light by interference. An interferometric modulator may comprise a pair of conductive plates, one or both of which may be transparent and/or reflective in whole or part and capable of relative motion upon application of an appropriate electrical signal. One plate may comprise a stationary or fixed layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed. An iMoD™ is one example of an interferometric light modulator. The iMoD employs a cavity having at least one movable or deflectable wall. As the wall, typically comprised at least partly of metal, moves towards a front surface of the cavity, interference occurs that affects the color of light viewed by a user.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In various embodiments of the invention, an anti-stiction coating is provided on at least one surface of a MEMS device in order to reduce attractive forces between the at least one surface and other surfaces of the MEMS device. More specifically, in certain embodiments, the anti-stiction coating is provided on at least one surface on an interior portion of an interferometric light modulating cavity. This interior portion with the anti-stiction coating may be a reflective element, such as a mirror, a transmissive element, such as a transparent substrate, or another layer on said reflective element or transmissive element.

In one embodiment, an interferometric light modulating device is provided, said device comprising: a reflective element; a transmissive element; and an anti-stiction coating located between at least a portion of said reflective element and said transmissive element.

In another embodiment, a method for manufacturing an interferometric light modulating device is provided, said method comprising: providing a transmissive element; providing a reflective element; and providing an anti-stiction coating, wherein said anti-stiction coating is located between at least a portion of said reflective element and said transmissive element.

In another embodiment, an interferometric light modulating device is provided, said device comprising: a reflective element; a transmissive element; and means for reducing attractive forces between said reflective element and said transmissive element.

In another embodiment, an interferometric light modulating device is provided by a method of manufacturing, said method comprising: providing a reflective element; providing a transmissive element; and providing an anti-stiction coating, wherein said anti-stiction coating is located between at least a portion of said reflective element and said transmissive element.

DETAILED DESCRIPTION OF THE PREFERRED EMBODIMENTS

Figure 1:
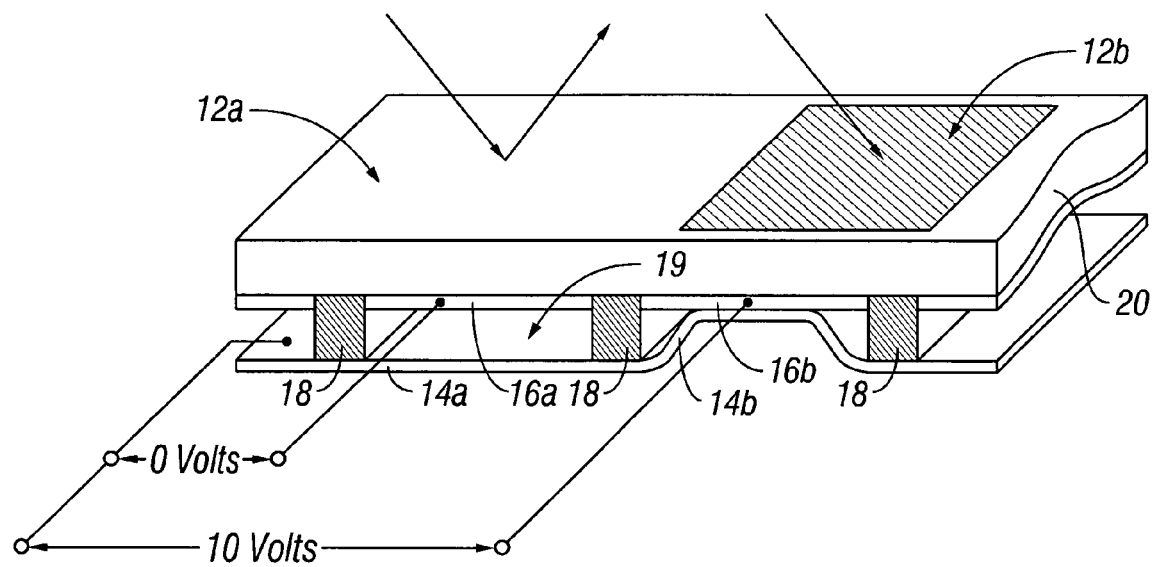
FIG. 1 is an isometric view depicting a portion of one embodiment of an interferometric modulator display in which a movable reflective layer of a first interferometric modulator is in a released position and a movable reflective layer of a second interferometric modulator is in an actuated position.

In various embodiments of the invention, an anti-stiction coating is formed on at least one surface of an interior cavity of a MEMS device. Stiction occurs when surface adhesion forces are higher than the mechanical restoring force of the micro-structure. One purpose of the anti-stiction coating is to prevent two movable layers of the device from sticking together. Particular embodiments provide an anti-stiction coating on one or more mirror surfaces of an interferometric light modulation device, also known as an iMoD. In some embodiments, the anti-stiction coating material includes a self-aligned (or self-assembled) monolayer.

In various embodiments, an interferometric light modulation device is encapsulated within a package and the anti-stiction coating is applied to the device after the package is fabricated. In one embodiment, one or more orifices are defined in the package, e.g., in a seal, a substrate or a backplate and the anti-stiction coating material is supplied into the interior of the package via the orifice(s).

In another embodiment, the anti-stiction coating can be incorporated into a release process wherein a sacrificial layer of an interferometric light modulation device is etched away with the use of a gas, such as $XeF_2$. For example, a mixture of the anti-stiction coating material and $XeF_2$ may be pumped into a chamber within the device. The chemistry of self aligning monolayers is generally compatible with $XeF_2$, and can be made to be co-existing processes in the same chamber. In another embodiment, the anti-stiction coating can be applied after the $XeF_2$ etching is complete.

In yet another embodiment, the anti-stiction coating may be applied to the sacrificial layer prior to an etching process. In one embodiment, sacrificial material is located within the interior cavity of the interferometric light modulating device. After the anti-stiction coating is applied to the sacrificial layer, another surface within the cavity comes in contact with the sacrificial layer, thereby coating at least a portion of the other surface. The sacrificial layer may then be etched away leaving at least a portion of the other surface with an anti-stiction coating. In some embodiments, the other surface may be a reflective surface such as a mirror, a transmissive surface such as a substrate, or another layer upon one or more of the reflective or transmissive surfaces.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The transparent substrate 20 may be any transparent substance capable of having a thin film or MEMS device built upon it. Such transparent substances include, but are not limited to, glass, plastic, and transparent polymers. The layers deposited on the substrate 20 are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
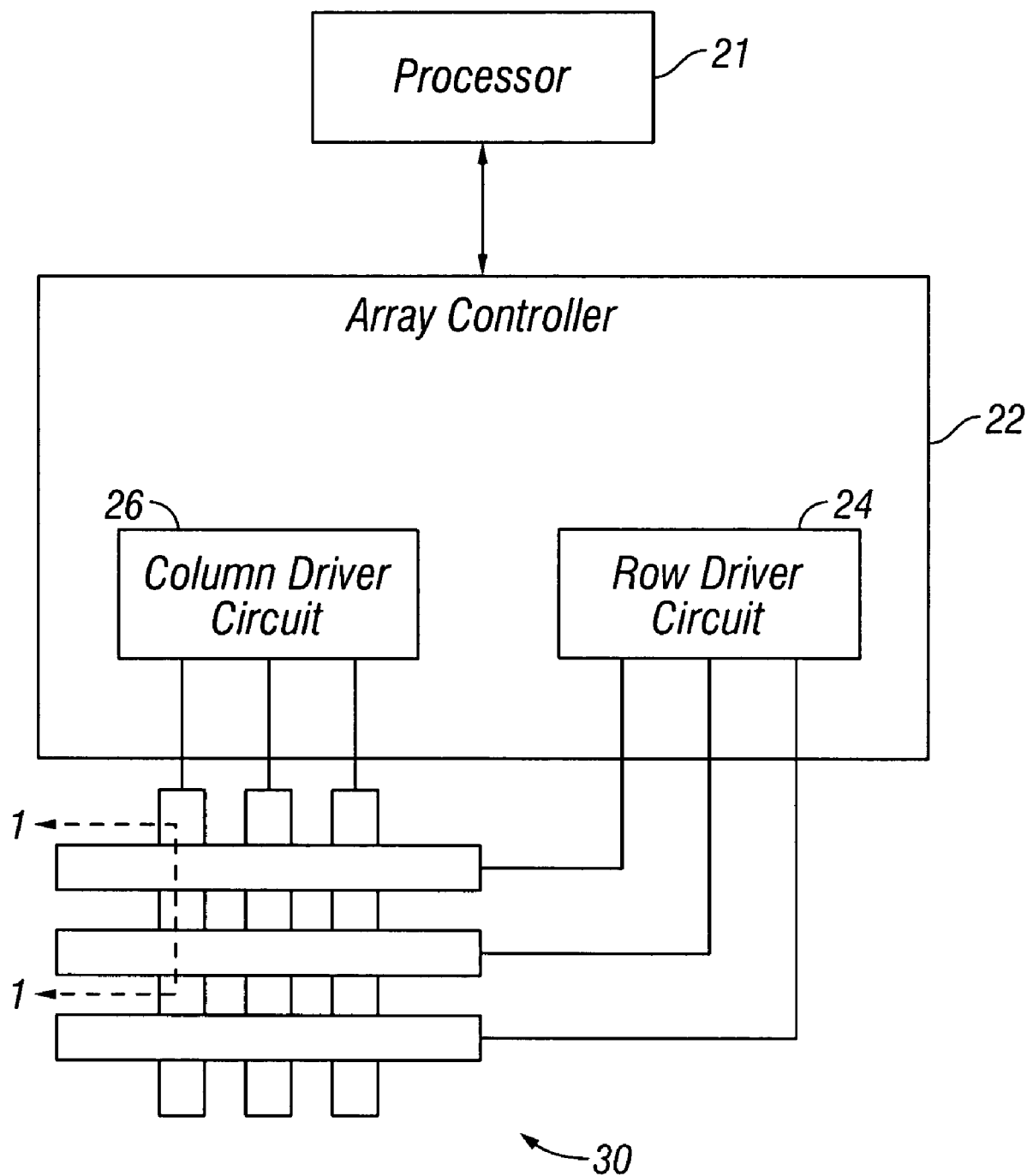
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts.

Figures 3, 4:
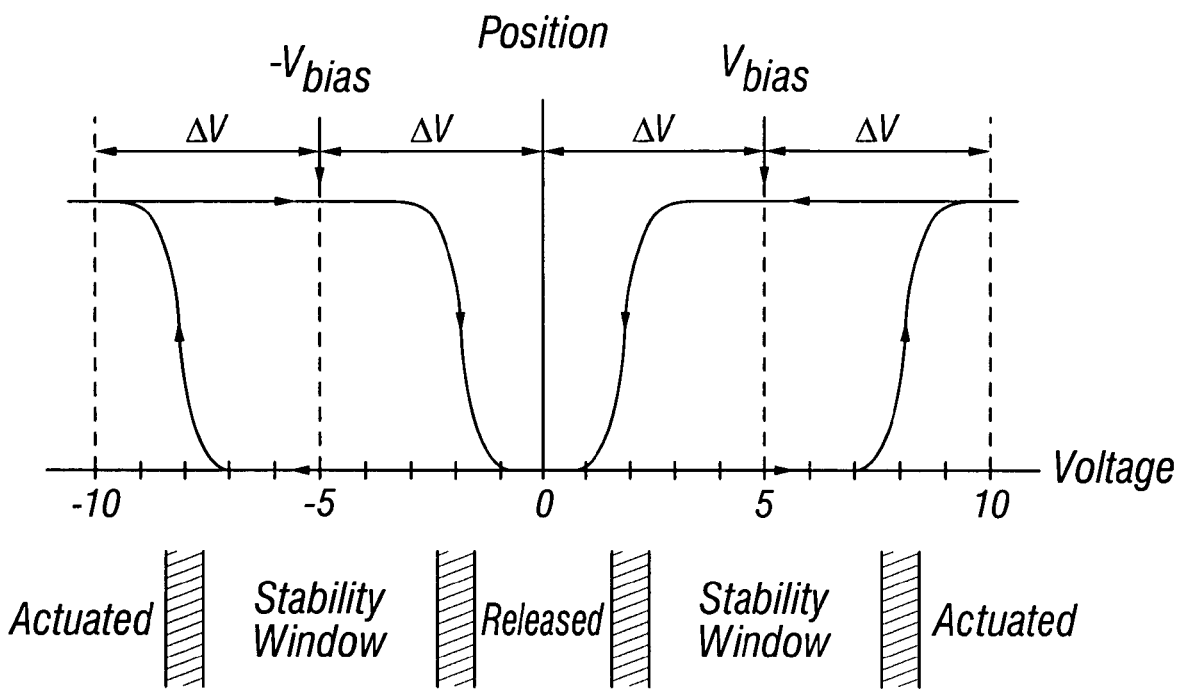
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to −Vbias, and the appropriate row to +ΔV, which may correspond to −5 volts and +5 volts respectively Releasing the pixel is accomplished by setting the appropriate column to +Vbias, and the appropriate row to the same +ΔV, producing a zero volt potential difference across the pixel. In those rows where the row voltage is held at zero volts, the pixels are stable in whatever state they were originally in, regardless of whether the column is at +Vbias, or −Vbias. As is also illustrated in FIG. 4, it will be appreciated that voltages of opposite polarity than those described above can be used, e.g., actuating a pixel can involve setting the appropriate column to $+V_{bias}$, and the appropriate row to −ΔV. In this embodiment, releasing the pixel is accomplished by setting the appropriate column to $-V_{bias}$, and the appropriate row to the same −ΔV, producing a zero volt potential difference across the pixel.

Figure 5A:
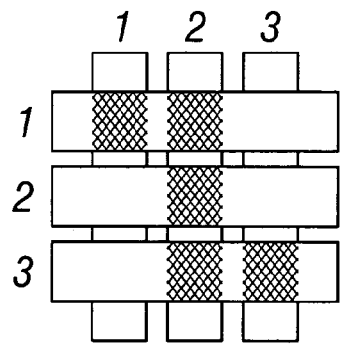
FIGS. 5A and 5B illustrate one exemplary timing diagram for row and column signals that may be used to write a frame of display data to the 3×3 interferometric modulator display of FIG. 2.
Figure 5B:
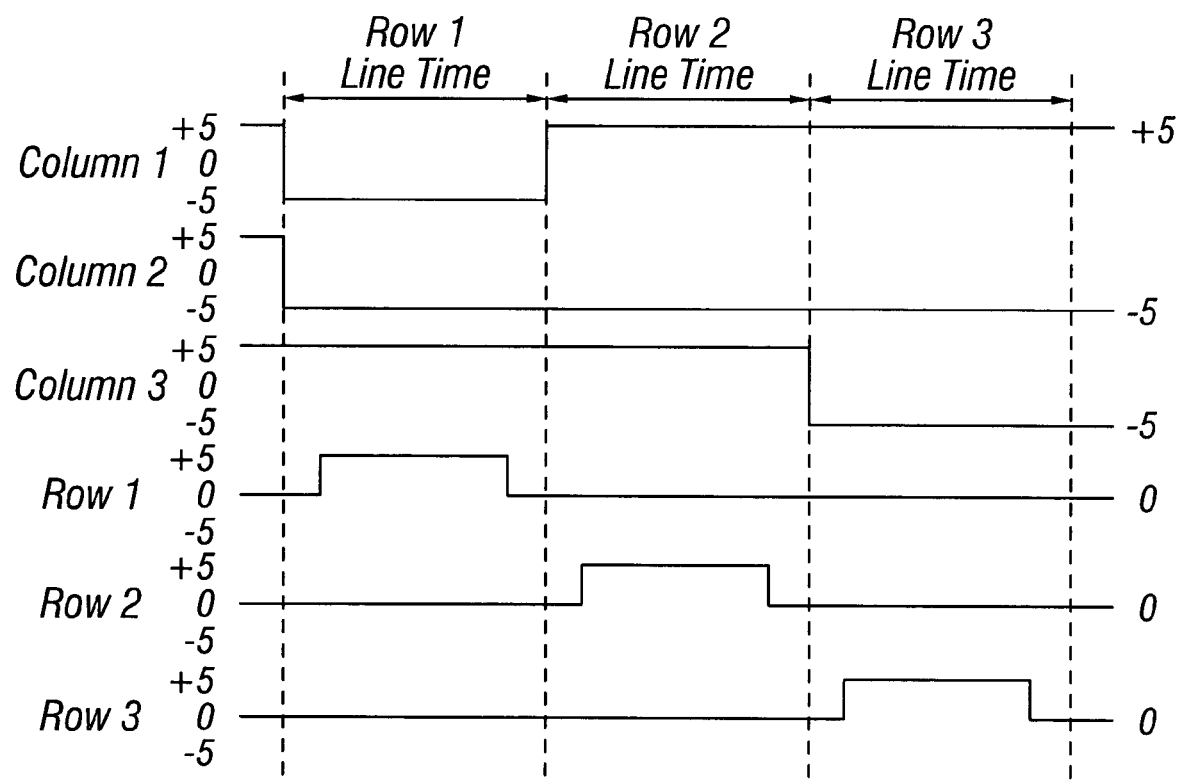

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
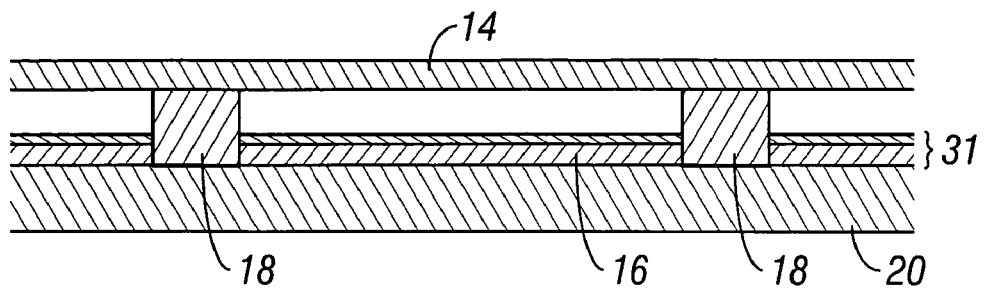
FIG. 6A is a cross section of the device of FIG. 1.
Figure 6B:
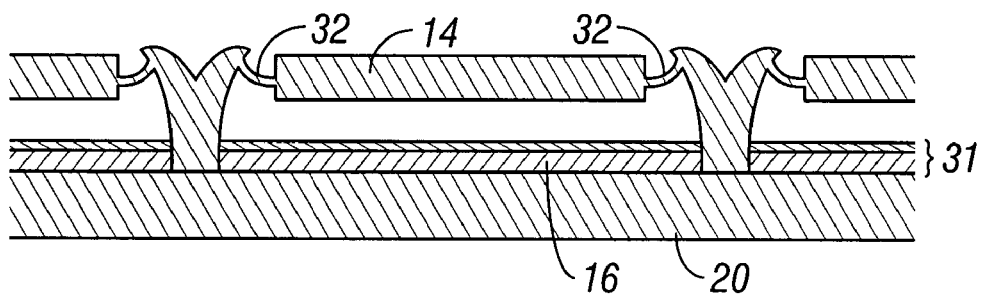
FIG. 6B is a cross section of an alternative embodiment of an interferometric modulator.
Figure 6C:
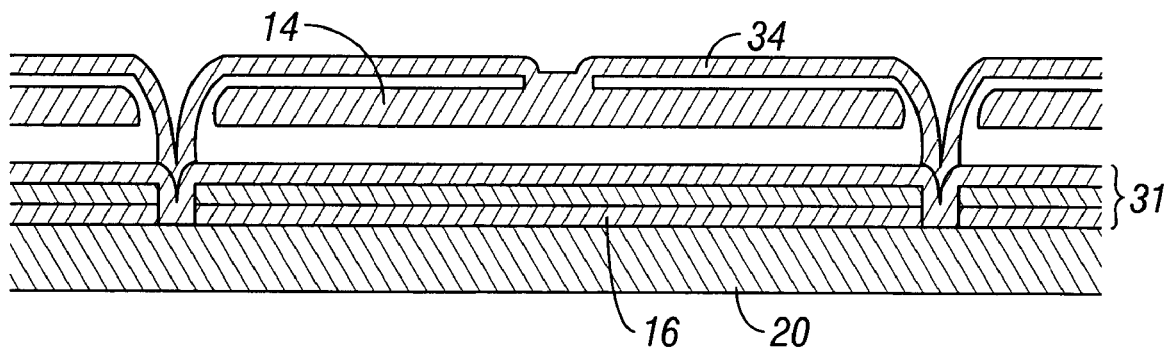
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. Each of the embodiments depicted in FIGS. 6A-6C comprise a moveable highly reflective element 14, a transparent substrate 20, and a thin film stack 31 layered upon said substrate 20, wherein said thin film stack 31 comprises a fixed partially reflective layer 16. FIG. 6A is a cross section of the embodiment of FIG. 1, where the moveable reflective layer 14 comprises a strip of metal material that is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Figure 7A:
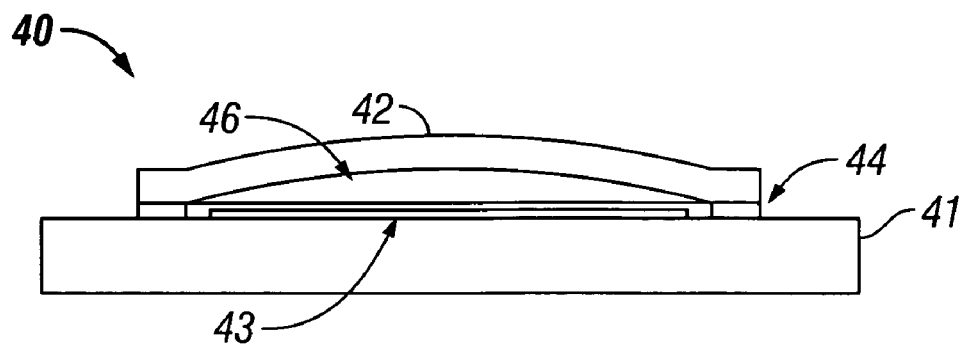
FIGS. 7A-7C are schematic views of a basic package structure for an interferometric modulator.
Figure 7B:
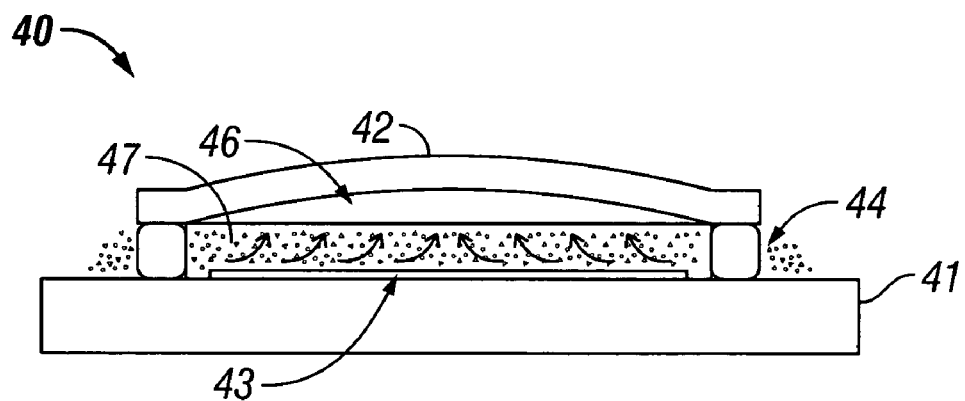
Figure 7C:
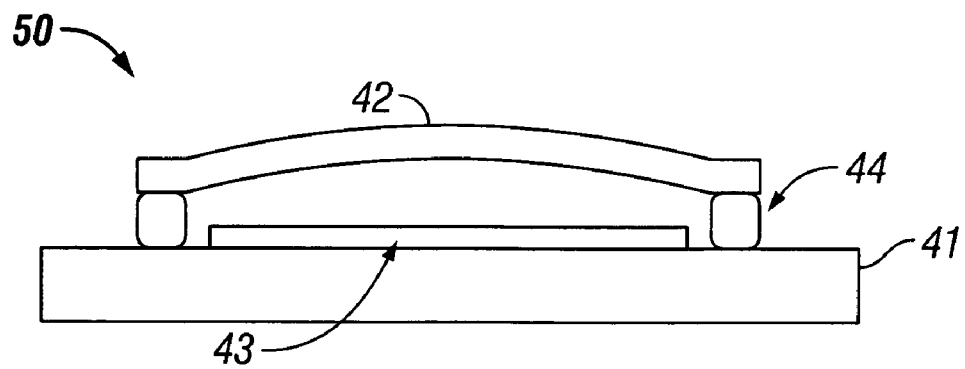

FIGS. 7A-7C are schematic views of a basic package structure for an interferometric modulator. As shown in FIG. 7A, the basic package structure 40 includes a transparent substrate 41 (e.g., glass) and a backplate or "cap" 42. As illustrated in FIGS. 7A-7C, an interferometric light modulator array 43 is encapsulated within the package structure 40. The backplate 42 may be formed of any suitable material, such as glass, metal, foil, polymer, plastic, ceramic, or semiconductor materials (e.g., silicon).

A seal 44 is typically provided to join the transparent substrate 41 and backplate 42 to form the package structure 40. Depending on embodiments, the seal 44 may be a non-hermetic, semi-hermetic, or hermetic seal. An example of a hermetic sealing process is disclosed in U.S. Pat. No. 6,589,625, the entirety of which is hereby incorporated by reference.

In one embodiment, a desiccant 46 is provided within the package structure 40 to reduce moisture within the package structure 40. In one embodiment, the desiccant 46 is positioned between the array 43 and the backplate 42. Desiccants may be used for packages that have either hermetic or semi-hermetic seals. Suitable desiccant materials include, but are not limited to, zeolites, molecular sieves, surface adsorbents, bulk adsorbents, and chemical reactants. The desiccant 46 can also be referred to as a getter material or can be used in addition to a getter material where the getter material is removing other materials as Oxygen or particles. In one embodiment, the amount of a desiccant used in the interior of the package 40 is chosen to absorb the water vapor that permeates through the seal 44 during the lifetime of the device 40.

Generally, the packaging process may be accomplished in a vacuum, pressure between a vacuum up to and including ambient pressure, or pressure higher than ambient pressure. The packaging process may also be accomplished in an environment of varied and controlled high or low pressure during the sealing process.

FIG. 7B illustrates flux of water vapor into the package 40 and absorption of the permeated water vapor by the desiccant 46. Referring to FIG. 7B, the desiccant 46 absorbs water or water vapor existing in the interior of the package 40. The desiccant 46 also absorbs water or water vapor 47 which has been permeated into the interior of the package 40 as shown in FIG. 7B.

In one embodiment, the package structure 50 may eliminate the need for a desiccant as shown in FIG. 7C. In this embodiment, the seal 44 is preferably a hermetic seal so that moisture traveling from the atmosphere into the interior of the package 50 is prevented or minimized. In another embodiment, instead of sealing the backplate 42 to the transparent substrate 41, a thin film (not shown) can be deposited on the transparent substrate 41 to encapsulate the array 43 within the package structure 50.

Figure 8:
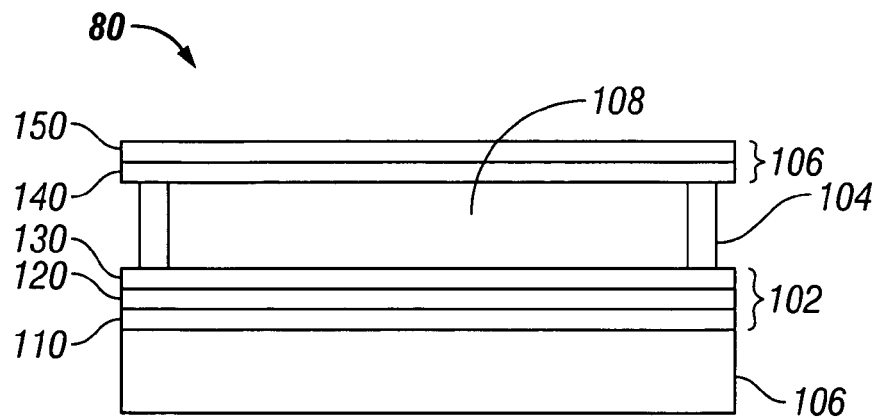
FIG. 8 is a detailed side view of an interferometric light modulator.

FIG. 8 is a detailed side view of interferometric light modulating device 80 comprising a light modulating cavity 108 where optical resonance occurs between a fixed partially reflective layer 102 and a moveable highly reflective layer 106. A partially reflective layer 102 is a transmissive element that transmits light and may be partially reflective. A moveable highly reflective layer 106 is a reflective element that reflects light and may be partially transmissive. The partially reflective layer 102 is layered upon a transparent substrate 100, which may be any transparent substrate capable of having thin film, MEMS devices built upon it. Such transparent substances include, but are not limited to, glass, plastic, and transparent polymers. The partially reflective layer 102, depicted here as a thin film stack of multiple sublayers, typically comprises an electrode sublayer 110 and a primary mirror sublayer 120. The primary mirror sublayer 120 may be made of a metallic film. In this embodiment an insulating sublayer 130 is disposed above the primary mirror sublayer 120 and functions as an insulator and also enhances reflection from the partially reflective layer 102. The moveable highly reflective layer 106, depicted here as a membrane of multiple sublayers, typically includes a secondary mirror sublayer 140 and an electrode sublayer 150. The secondary mirror sublayer 140 may be made of a metallic film. Posts 104 are formed to support the moveable highly reflective layer 106. In one embodiment, the posts 104 are insulators. The electrode layers 110 and 150 are connected to the voltage source (V) shown in FIG. 1 so that the voltage (V) can be applied across the two layers 102 and 106. Other interferometric modulator configurations and operating modes are disclosed in U.S. Pat. No. 5,835,255, which is hereby incorporated by reference in its entirety.

As used herein, the terms reflective element and transmissive element are to be given their broadest ordinary meaning. A reflective element is at least one layer that reflects light and may be partially transmissive to light. The term reflective element may refer to, but is not limited by, the elements described herein as the moveable highly reflective layer 106 or the secondary mirror sublayer 140. A transmissive element is at least one layer that transmits light and may partially reflect light. The term transmissive element may refer to, but is not limited by, the elements described herein as the fixed partially reflective layer 102 or the primary mirror sublayer 120.

Referring to FIG. 8, in the driven state of an interferometric light modulating device 80, the moveable highly reflective layer 106, depicted here as a membrane, may make contact with the fixed partially reflective layer 102, depicted here as a thin film stack. When a potential difference is applied to layers 102 and 106, a capacitor is formed between these two layers, which creates electrostatic forces that pull the highly reflective layer 106 towards the partially reflective layer 102. This results in the cavity 108 collapsing. If the voltage is high enough, the highly reflective layer 106 may be deformed and forced against the partially reflective layer 102 completely collapsing the cavity 108. When no potential difference is applied, however, the mechanical restoration forces of the moveable highly reflective layer 106 and its surrounding structure may return layer 106 to its original position, thereby restoring the cavity 108. But even in the undriven state, both of the layers 106 and 102 are closely located to each other, e.g., about 0.2 µm. Thus, the mechanical restoration forces of the moveable highly reflective layer 106 should be carefully balanced with the electrostatic forces created between the layer 106 and the fixed partially reflective layer 102 in order to ensure proper operation and responsiveness of the interferometric light modulating device 80.

There are additional attractive forces that may disturb the balance of forces described above. These additional attractive or adhesive forces include "capillary water condensation" and/or "van der Waals forces." During the lifetime of an interferometric light modulating device, water vapor (or water) can continuously permeate into the interior of the device (as depicted in FIG. 7B) and the permeated water vapor can exist on the surfaces of each of the layers 102 and 106. The water vapor can cause the two layers 102 and 106 to have an additional attractive capillary force between them due to water condensation. Furthermore, the "van der Waals" forces, which are short range forces causing adjacent materials to become attracted at the molecular level, can cause the layers 102 and 106 to have an additional attractive force between them. In an interferometric light modulating device 80, the moveable highly reflective layer 106, including the secondary mirror sublayer 140, moves toward and from the fixed partially reflective layer 102, which includes the primary mirror sublayer 120, depending on the operation state. If there are additional attractive forces between layers 102 and 106, the device 80 may fail to operate properly, even to the point to where the layers may stick together. Thus, in embodiments of the invention, means for reducing attractive forces between layers 102 and 106 include an anti-stiction coating applied on one or more of the layer surfaces (or sublayer surfaces) of an interferometric light modulating device 80 so that the additional attractive forces between adjacent surfaces due to events such as capillary water condensation or van der Waals forces may be minimized or eliminated.

As used herein, the term anti-stiction coating is to be given its broadest ordinary meaning, including but not limited to a material that reduces attractive forces between surfaces. The term anti-stiction coating may refer to, but is not limited to, a self-aligned monolayer (also referred to as a self-assembled monolayer). In some embodiments, an example of an anti-stiction coating includes, but is not limited to, a self-aligning monolayer such as one or more of the following: fluoro silane, chloro-fluoro silane, methoxy silane, trichlorosilane, perfluorodecanoic carboxylic acid, octadecyltrichlorosilane (OTS), or dichlorodimethylsilane. In some embodiments, an example of an anti-stiction coating includes, but is not limited to, polymeric materials such as one or more of the following: teflon, silicone, polystyrene, polyurethane (both standard and ultraviolet curable), a block copolymer containing a hydrophobic component (for example poly-methyl-methacrylate), or polysilazane (especially with polisiloxane). In some embodiments, an example of an anti-stiction coating includes, but is not limited to, inorganic materials such as one or more of the following: graphite, diamond-like carbon (DLC), silicon carbide (SiC), a hydrogenated diamond coating, or fluorinated DLC. In some embodiments, the anti-stiction coating does not significantly adversely affect the optical responses or characteristics of the optical cavity 108, such as the optical responses and/or characteristics of layers 102 or 106.

Figure 9:
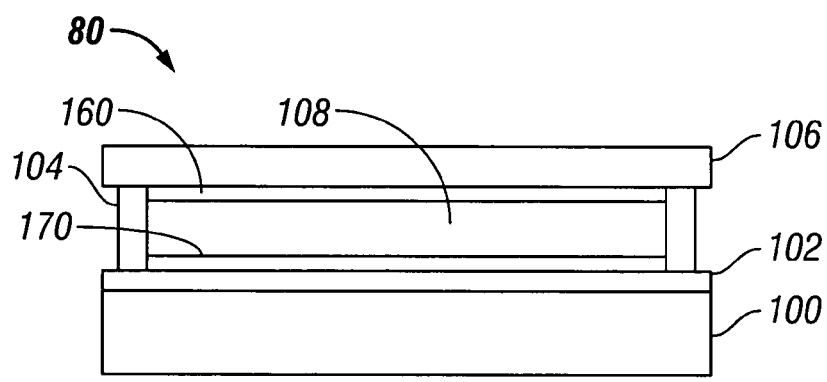
FIG. 9 illustrates an interferometric modulator coated with anti-stiction material according to one embodiment of the invention.

FIG. 9 illustrates an interferometric light modulating device 80 with portions of layers 102 and 106 within the light modulating cavity 108 coated with anti-stiction material 160 and 170, respectively, according to one embodiment of the invention. In other embodiments, at least a portion of all surfaces within the light modulating cavity 108 are coated with an anti-stiction material, including the posts 104.

Figure 10:
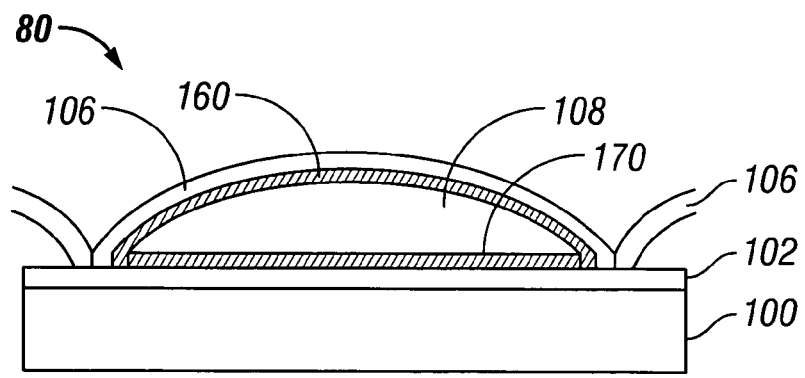
FIG. 10 illustrates an interferometric modulator coated with anti-stiction material according to another embodiment of the invention.

FIG. 10 illustrates an alternative embodiment of interferometric light modulating device 80 with layers 102 and 106 coated with anti-stiction material according to another embodiment of the invention. In this embodiment, anti-stiction coating layers 160 and 170 are formed on surfaces of the layers 106 and 102 that are interior to the cavity 108. In this embodiment, the moveable highly reflective layer 106 includes its own vertical support mechanism via a domed shape, unlike the FIG. 9 embodiment where there are separate posts 104 formed between the two layers 106 and 102. Although FIGS. 9 and 10 depict anti-stiction coating layers 160 and 170 as covering the entire surface of layers 102 and 106 within light modulating cavity 108, only coating a portion of layer 102 and/or layer 106 is contemplated by the present invention. For example, in one embodiment, only a portion of layer 102 comprises an anti-stiction coating. In another embodiment, only a portion of layer 106 comprises an anti-stiction coating.

Figure 11A:
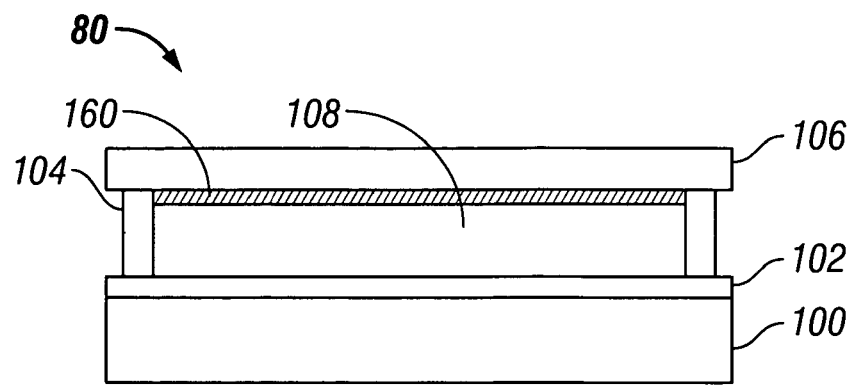
FIGS. 11A, 11B, and 11C illustrate an interferometric modulator coated with anti-stiction material according to another embodiment of the invention.
Figure 11B:
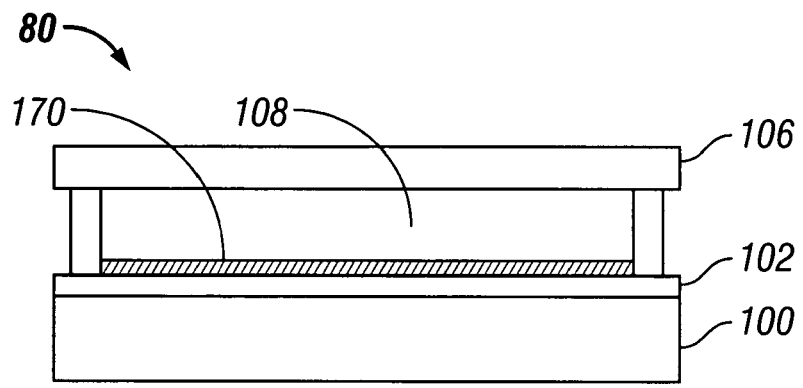
Figure 11C:
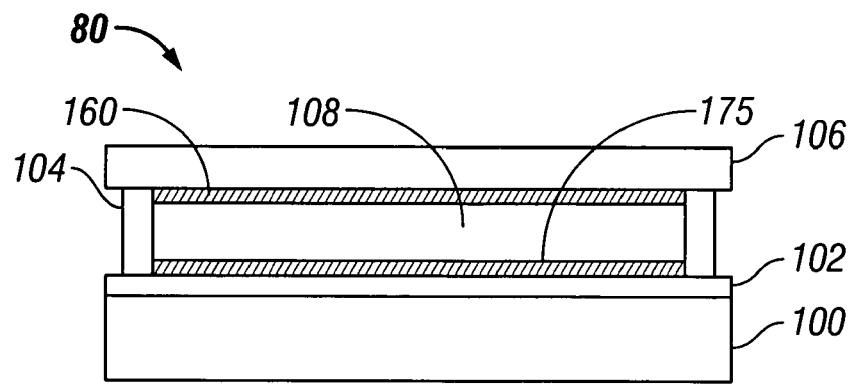

FIGS. 11A, 11B, and 11C illustrate an interferometric light modulating device 80 with selective coating of one or more layers according to embodiments of the invention. In FIG. 11A, the anti-stiction layer 160 is provided on the surface of the moveable highly reflective layer 106 and not on the fixed partially reflective layer 102. Conversely, in FIG. 11B, the anti-stiction layer 170 is provided on the surface of layer 102 and not on layer 106.

As depicted in FIG. 11C, one way to accomplish the selective coating illustrated in FIGS. 11A and 11C is to use a covering element 175. During the coating process, the surfaces which are not intended to be coated, depicted here as the fixed partially reflective layer 102, may be covered with the covering element 175, such as a sacrificial material, so that the anti-stiction coating layer is not formed on the surfaces covered by the covering element 175. In other embodiments, the covering element 175 may be provided on any surface(s) within the cavity 108 where an anti-stiction coating is not desired, such as the surface of posts 104 that are within the cavity 108.

Figure 12A:
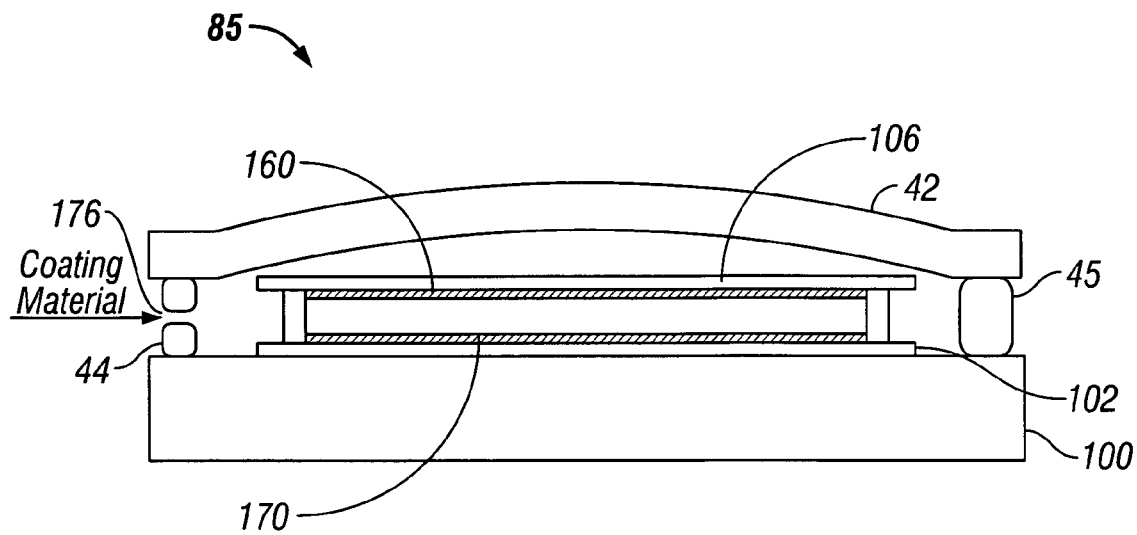
FIGS. 12A and 12B illustrate an interferometric modulator coated with anti-stiction material according to still another embodiment of the invention.
Figure 12B:
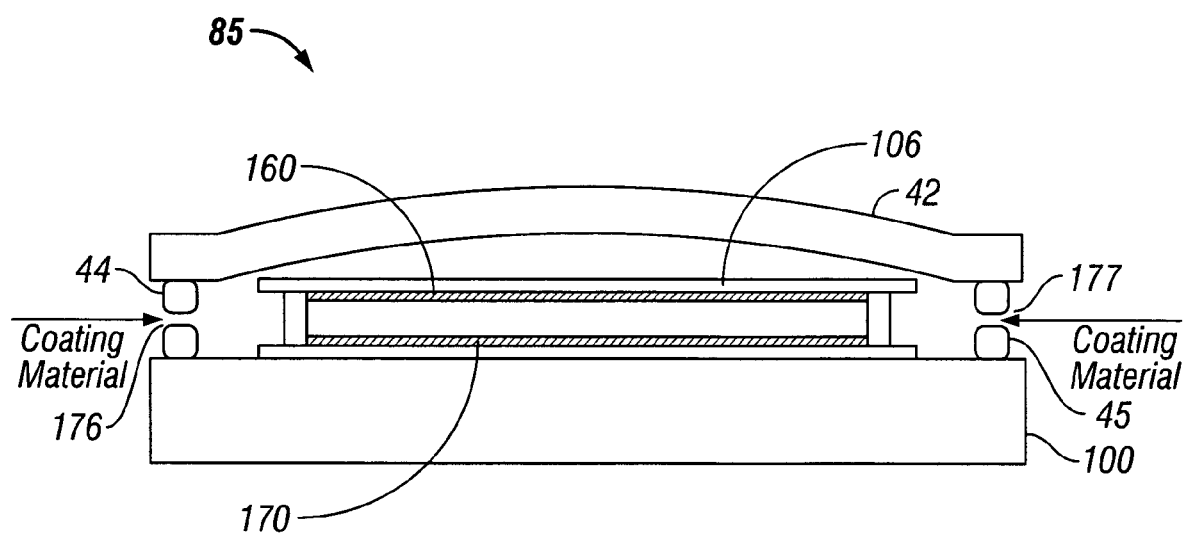

FIGS. 12A and 12B illustrate an interferometric light modulating device package 85 with layers 102 and layer 106 coated with anti-stiction material according to another embodiment of the invention. In these embodiments, layers 102 and 106 are encapsulated within the package 85 and the application of the anti-stiction coating is performed after the package 85 is fabricated. In one embodiment, the backplate 42 is a recessed structure or a formed structure, but not necessarily so if the amount of a desiccant (not shown in FIGS. 12A and 12B) in the package 85 is reduced or removed. In this embodiment, the requirements on the recessed depth can be lessened or eliminated. In one embodiment, the use of anti-stiction layers 160 and 170 (e.g., self-aligning monolayers) can allow for altered cap (backplate) designs to reduce the required recess compared to the recess needed if using a desiccant.

In the embodiments depicted in FIGS. 12A and 12B, an orifice 176 is defined in the package, e.g., in the seal 44 as shown in FIG. 12A or 12B. In these embodiments, the anti-stiction coating material may be supplied into the interior of the package 85 via the orifice 176. In another embodiment, two orifices 176 and 177 are created in the package 85, e.g., in the seals 44 and 45 for the delivery of the anti-stiction material, as shown in FIG. 12B. In still another embodiment, more than two orifices (not shown) can be defined in the package 85 and the anti-stiction coating material is supplied into the interior of the package 20 via the orifices. In other embodiments, orifice(s) may be formed in the substrate 100 or the backplate 42. Thus, having orifice(s) within the seal 44, substrate 100, and/or backplate 42 for the delivery of the anti-stiction coating is within the scope of the present invention.

In these embodiments, the orifice(s) formed in the package 85 may also be used to remove water vapor from the interior of the package 85. After the orifice(s) are no longer needed, they may be plugged, welded or sealed, depending on the nature of the orifice(s).

Figure 13:
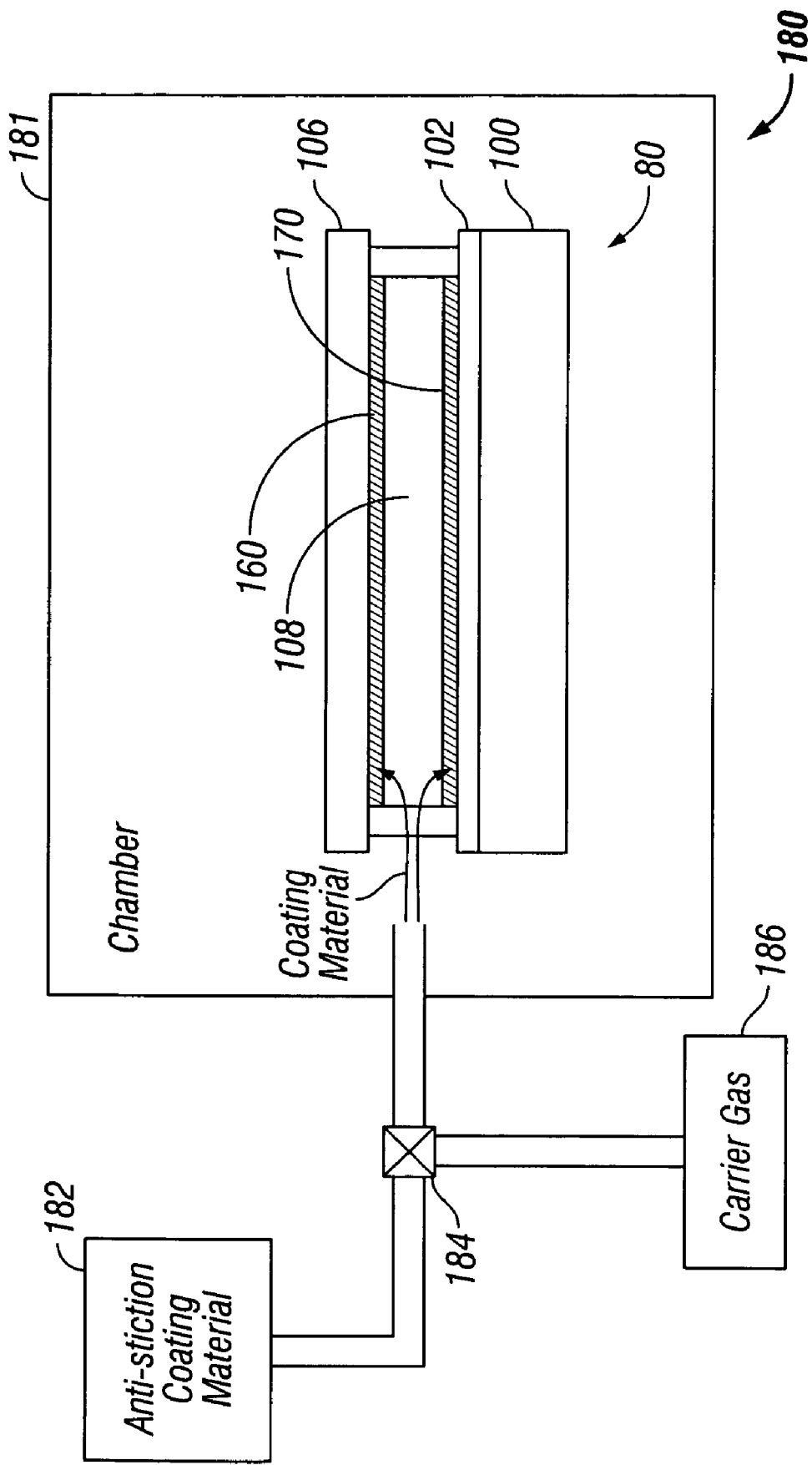
FIG. 13 illustrates an anti-stiction layer coating system for an interferometric modulator according to one embodiment of the invention.

FIG. 13 illustrates an anti-stiction layer coating system for an interferometric light modulating device 80 according to one embodiment of the invention. Referring to FIG. 13, the system 180 comprises a chamber 181, a coating material container 182, a valve 184, and a carrier gas reservoir 186. A person skilled in the art will appreciate that the system 180 is only exemplary and other coating systems, which can exclude some of the elements of the system 180 and/or include additional elements, may be used. In one embodiment, the system 180 may perform an anti-stiction coating for the fabricated package as shown in FIGS. 11A, 11B and 11C.

The valve 184 controls feeding the coating material into the chamber 181. In one embodiment, the valve 184 is controlled by a computing device. In one embodiment, the valve 184 may be any suitable valve for this anti-stiction coating process. In another embodiment, the valve 184 may be used to properly mix and time the carrier gas with the $XeF_2$ etchant gas.

The container 182 contains anti-stiction coating material. In various embodiments, as discussed above, an example of an anti-stiction coating can include, but is not limited to, the following: a self-aligning (or self-assembling) monolayer such as OTS, dichlorodimethylsilane, etc.; other polymeric materials such as teflon, polystyrene, etc.; or other inorganic materials such as graphite, DLC, etc. In another embodiment, the coating material includes any anti-stiction material which does not significantly adversely affect the optical responses or characteristics of the optical cavity 108, such as the optical responses and/or characteristics of layers 102 or 106.

In one embodiment, the carrier gas reservoir 186 contains a carrier gas such as nitrogen ($N_2$) or argon, which is used to transport the anti-stiction coating material to the chamber 181 by a known pumping mechanism. In another embodiment, the carrier gas can incorporate other types of getter material or chemistries as long as the performance of the interferometric light modulating device 80 is not significantly adversely affected. In another embodiment, the carrier gas can be integrated into the chemistry of the release etchant gas of $XeF_2$.

Figure 14:
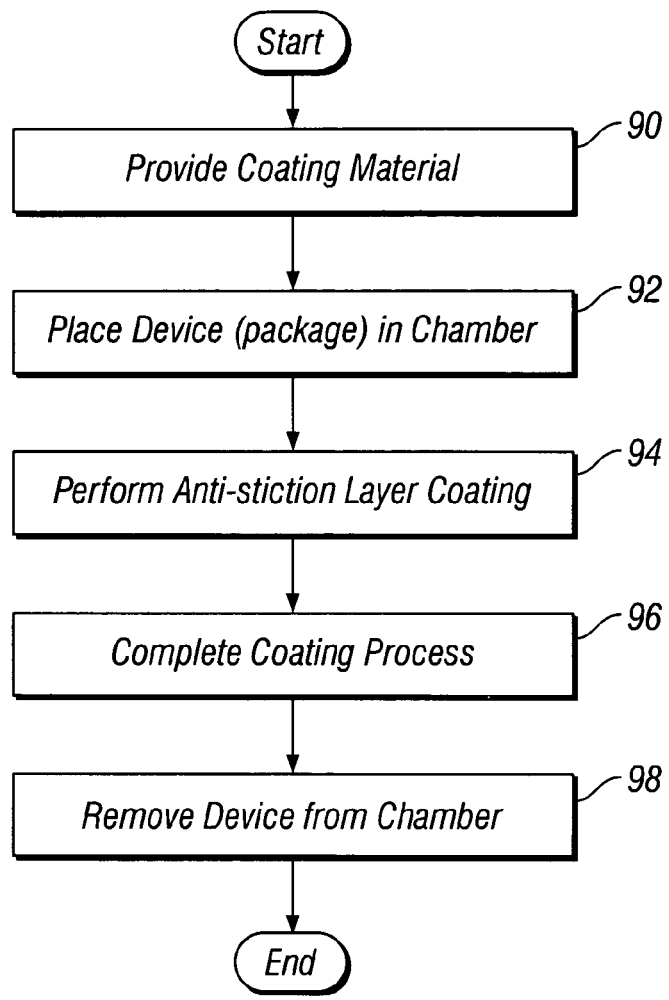
FIG. 14 is a flow chart of a method of providing an anti-stiction coating to a MEMS device according to one embodiment of the invention.

FIG. 14 is an exemplary flowchart describing an anti-stiction coating process according to one embodiment of the invention. A skilled person will appreciate that depending on the embodiments, additional states may be added, others removed, or the order of the states changes. Referring to FIGS. 7-12, the anti-stiction coating procedure according to embodiments of invention will be described in more detail.

Anti-stiction coating material is provided in step 90. The interferometric light modulating device 80, whose surface(s), such as layers 102 and/or 106, will be coated, is placed in the chamber 181 at step 92. An anti-stiction layer coating is applied on the surfaces to be coated in step 94. In one embodiment, the surface of layers 102 and/or 106, such as a mirror surface or an insulator surface, may be heated so that water vapor existing on the surfaces to be coated is removed before the anti-stiction coating is performed. In one embodiment, the insulating sublayer 130 is not provided and the anti-stiction layer is formed on the surface of the primary mirror sublayer 120 (depicted in FIG. 8). In another embodiment, the anti-stiction layer is formed on the surface of the secondary mirror sublayer 140 (depicted in FIG. 8). In another embodiment, the anti-stiction layer is formed on the surfaces of the insulating sublayer 130 and secondary mirror sublayer 140 (depicted in FIG. 8).

In one embodiment of the anti-stiction coating process, the anti-stiction layer is formed during an interferometric light modulating device fabrication process. For example, the anti-stiction layer coating may be incorporated into a "release" process. In the release process, a sacrificial layer 175 (depicted in FIG. 11C) of the interferometric light modulating device 80 is etched away with the use of a gas, for example, $XeF_2$. In one embodiment, a mixture of the anti-stiction coating material and $XeF_2$ may be pumped into the chamber 181. In another embodiment, the anti-stiction coating can be applied after the $XeF_2$ etching is complete. Typically, the release process is performed by a MEMS etching system, for example, X3 Series Xetch available from XACIX, USA, and MEMS ETCHER available from Penta Vacuum, Singapore.

In another embodiment of the anti-stiction coating process, the anti-stiction layer is formed uniformly in its thickness. In another embodiment, the thickness of the anti-stiction coating layer may not be uniform. Generally, an anti-stiction layer such as a self-aligned monolayer is a thin film coating and thus it does not significantly affect the optical characteristics (or responses) of the layers 102 or 106, including mirrors 120 and 140 (depicted in FIG. 8), even if the anti-stiction coating is not uniform.

In one embodiment, the anti-stiction coating is performed using a process disclosed in, for example, "Dichlorodimethylsilane as an Anti-Stiction Monolayer for MEMS," Journal of Microelectromechanical Systems, Vol. 10, No. 1, March 2001 and U.S. Pat. No. 6,335,224, which are hereby incorporated by reference. In another embodiment, the anti-stiction coating is performed using a deposition process, such as chemical vapor deposition or a physical vapor deposition. In still another embodiment, any suitable anti-stiction coating method on mirror or insulator surfaces, either known or developed in the future, can be used. The anti-stiction coating process is then completed in step 96 and the interferometric light modulating device 80 is removed from the chamber 181 in step 98.

Figure 15:
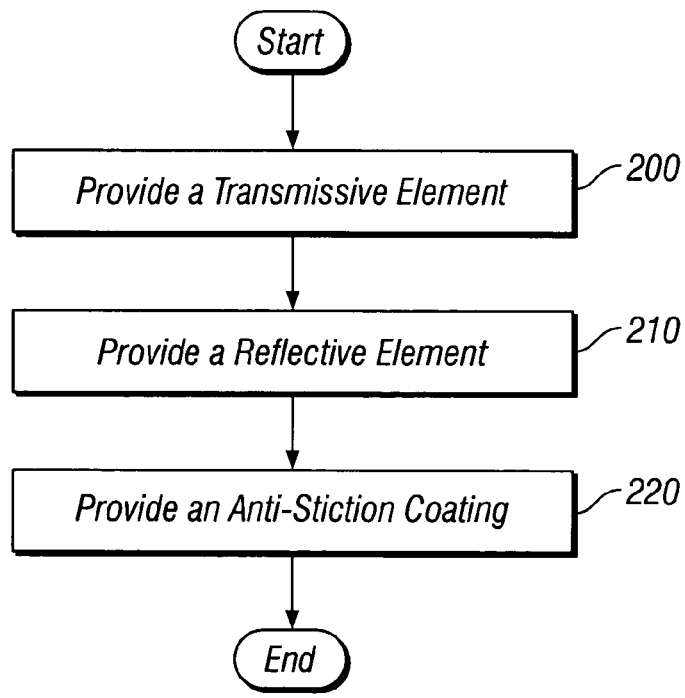
FIG. 15 is a flow chart of a method of providing an anti-stiction coating to an interferometric light modulating device according to one embodiment of the invention.

FIG. 15 is a flowchart describing an anti-stiction coating method for an interferometric light modulating device according to one embodiment of the invention. This Figure illustrates another method for reducing attractive forces between layers within a light modulating device. In accordance with this method, the interferometric light modulating devices described in instant application may be fabricated, including the devices described with reference to FIGS. 7-12. In this method, a transmissive element is provided in step 200. The transmissive element may be provided by layering the transmissive element upon a substrate. This transmissive element may be, for example, the fixed partially reflective layer 102 or any of its sublayers, such as the primary mirror sublayer 120, the insulating sublayer 130, or electrode sublayer 110 depicted in FIG. 8. A reflective element is provided in step 210. The reflective element may be provided by forming a stack over the transmissive element. This reflective element may be, for example, the moveable highly reflective layer 106 or any of its sublayers, such as the secondary mirror sublayer 140 or the electrode sublayer 150 depicted in FIG. 8. An anti-stiction coating is then provided in step 220, wherein the anti-stiction coating is located between at least a portion of the reflective element and the transmissive element. The anti-stiction coating may be provided as described herein with reference to FIGS. 11-14. A person skilled in the art will appreciate that the method depicted in FIG. 15 is only exemplary and other coating methods, which may exclude some of the elements or steps in the depicted method and/or include additional elements or steps, may be used.

For example, in another embodiment, the reflective element may be provided before the transmissive element is provided. Also, in other embodiments, the anti-stiction coating is provided after either the reflective element or the transmissive element is provided. Also, in other embodiments, covering elements, such as a sacrificial layer, may be applied to portions of the interferometric light modulating device where an anti-stiction coating is not desired. Then, if desired, after the anti-stiction coating is provided, other elements may make contact with the coated covering element(s), thereby providing an anti-stiction coating by transfer contact. The covering elements and/or sacrificial layers may then be etched. In other embodiments, a sacrificial layer is provided between the reflective element and the transmissive element and the sacrificial layer is then etched prior to providing the anti-stiction coating. In other embodiments, the transmissive element and reflective element are packaged into an interferometric light modulating device package, such as one depicted in FIGS. 12A and 12B, prior to providing the anti-stiction coating. In other embodiments the anti-stiction coating is provided prior to the packaging.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

The invention claimed is:

1. An interferometric light modulating device, comprising:
   a reflective element;
   a transmissive element;
   an anti-stiction coating located between said reflective element and said transmissive element and;
   a sacrificial layer located between said reflective element and said transmissive element, wherein said anti-stiction coating is provided on at least a portion of said sacrificial layer.

2. The device of claim 1, further comprising a transparent substrate, wherein said substrate is adhered to a backplate with a seal to form a sealed package, and wherein said reflective element, said transmissive element and said anti-stiction coating are located within said sealed package.

3. The device of claim 2, further comprising a desiccant, wherein said desiccant is located within said sealed package.

4. The device of claim 1, wherein said anti-stiction coating comprises a self aligning monolayer.

5. The device of claim 1, wherein said anti-stiction coating is selected from the group consisting of: teflon, perfluorodecanoic carboxylic acid, octadecyltrichlorosilane (OTS), dichlorodimethylsilane, fluoro silane, chloro-fluoro silane, methoxy silane, trichlorosilane, silicone, polystyrene, polyurethane, a block copolymer containing a hydrophobic component, polysilazane, graphite, diamond-like carbide (DLC), silicon carbide (SiC), hydrogenated diamond coating, and fluorinated DLC.

6. The device of claim 2, further comprising at least one orifice in said package.

7. The device of claim 6, wherein said at least one orifice is an orifice in said seal, said substrate or said backplate.

8. The device of claim 1, wherein said anti-stiction coating is provided on only a portion of said reflective element.

9. The device of claim 1, wherein said anti-stiction coating is provided on only a portion of said transmissive element.

10. The device of claim 1, wherein the anti-suction coating covers the entire surface of The reflective element.

11. The device of claim 1, wherein the anti-stiction coating covers the entire surface of the transmissive element.

12. The device of claim 1, wherein the anti-stiction coating covers the entire surface of the reflective element where the optical resonance occurs.

13. The device of claim 1, wherein the anti-stiction coating covers the entire surface of the transmissive element where the optical resonance occurs.

14. An interferometric light modulating device, comprising:
   a reflective element;
   a transmissive element;
   an anti-stiction coating located between substantially all points of said reflective element and said transmissive element which would otherwise contact one another if the anti-stiction coating were absent; and
   a sacrificial layer located between said reflective element and said transmissive element, wherein said anti-stiction coating is provided on at least a portion of said sacrificial layer.

15. The device of claim 14, wherein the reflective element comprises a moveable minor.

16. The device of claim 14, wherein the transmissive element comprises a substrate comprising at least one of glass, plastic, and a transparent polymer.

17. The device of claim 14, wherein the anti-stiction coating is located within an optically resonant cavity defined by the reflective element and the transmissive element.

18. The device of claim 14, further comprising an array of reflective elements forming an array of interferometric display elements.

19. The device of claim 14, wherein the anti-stiction coating is located on the reflective element.

20. The device of claim 14, wherein the anti-stiction coating is located on the transmissive element.

* * * * *

UNITED STATES PATENT AND TRADEMARK OFFICE
CERTIFICATE OF CORRECTION

PATENT NO. : 7,692,839 B2  Page 1 of 1
APPLICATION NO. : 11/119433
DATED : April 6, 2010
INVENTOR(S) : Palmateer et al.

It is certified that error appears in the above-identified patent and that said Letters Patent is hereby corrected as shown below:

Title Page 1, Under Abstract, Line 5, After "or" insert --more--.

Title Page 3, In Column 1, Line 51, Under U.S. Patent Documents, after "Coleman, Jr" insert --, deceased--.

Title Page 4, In Column 2, Line 41, Under Other Publications, change "Octadecyltrichlosilane" to --Octadecyltrichlorosilane--.

In Column 6, Line 35, change "1pulse." to --1 pulse.--.

In Column 6, Line 49, Change "-Vbias," to --$V_{bias}$,--.

In Column 6, Line 51, Change "resepectively" to --respectively.--.

In Column 6, Line 52, Change "+Vbias," to --+$V_{bias}$,--.

In Column 6, Line 56, Change "+Vbias," to --+$V_{bias}$,--.

In Column 6, Line 57, Change "-Vbias," to -- -$V_{bias}$,--.

In Column 10, Line 21, Change "polisiloxane)." to --polysiloxane).--.

In Column 14, Line 22, In Claim 4, change "self aligning" to --self-aligning--.

In Column 14, Line 41, In Claim 10, change "anti-suction" to --anti-stiction--.

In Column 14, Line 42, In Claim 10, change "The" to --the--.

In Column 14, Line 47, In Claim 12, change "opticai" to --optical--.

In Column 14, Line 64, In Claim 15, change "minor." to --mirror.--.

Signed and Sealed this

Thirtieth Day of November, 2010

David J. Kappos
*Director of the United States Patent and Trademark Office*